United States Patent
Van Der Heijden et al.

(10) Patent No.: US 12,421,170 B2
(45) Date of Patent: Sep. 23, 2025

(54) GRANULATE MATERIAL AND ASSOCIATED COATING THAT IS LOW IN ODOR AND EMISSIONS, PARTICULARLY A CONSTRUCTION ELEMENT COATING, FOR EXAMPLE A FLOOR COATING, BASED ON A RADICAL POLYMERIZATION

(71) Applicant: SIDEC NV, Balen (BE)

(72) Inventors: Sam Van Der Heijden, Sint-Niklaas (BE); Mark Lode Vandebroek, Beringen (BE); Nils De Rybel, Ghent (BE); Karen De Clerck, Afsnee (BE); Dagmar Rafaël J. D'Hooge, De Pinte (BE)

(73) Assignee: SIDEC NV, Balen (BE)

( * ) Notice: Subject to any disclaimer, the term of this patent is extended or adjusted under 35 U.S.C. 154(b) by 907 days.

(21) Appl. No.: 17/614,654

(22) PCT Filed: May 27, 2020

(86) PCT No.: PCT/EP2020/064774
§ 371 (c)(1),
(2) Date: Nov. 29, 2021

(87) PCT Pub. No.: WO2020/239877
PCT Pub. Date: Dec. 3, 2020

(65) Prior Publication Data
US 2022/0220031 A1    Jul. 14, 2022

(30) Foreign Application Priority Data

May 28, 2019 (BE) .................................. 2019/5349

(51) Int. Cl.
*C04B 20/10*    (2006.01)
*B32B 5/16*    (2006.01)
(Continued)

(52) U.S. Cl.
CPC ........ *C04B 20/1033* (2013.01); *C04B 20/123* (2013.01); *C04B 26/06* (2013.01);
(Continued)

(58) Field of Classification Search
CPC ........... C04B 2111/00482; C08K 3/013; Y10T 428/2991; Y10T 428/2998
See application file for complete search history.

(56) References Cited

U.S. PATENT DOCUMENTS

| 5,254,633 A | 10/1993 | Han et al. |
| 9,175,171 B2 | 11/2015 | Neugebauer et al. |

(Continued)

FOREIGN PATENT DOCUMENTS

| CN | 101665649 B | * | 11/2013 | |
| WO | WO-2005016983 A1 | * | 2/2005 | ............ C08F 265/04 |

OTHER PUBLICATIONS

Translation CN 101665649 B (Year: 2013).*
(Continued)

*Primary Examiner* — Hoa (Holly) Le (57) ABSTRACT

Granulate material for a radical chain-growth polymerization based coating formulation, adapted to minimize inhibition of resin polymerization by ambient air, composition of granulate material, coating formulation kit, and process for applying a radical chain-growth polymerization based coating formulation kit.

16 Claims, 1 Drawing Sheet

(51) Int. Cl.
*C04B 20/12* (2006.01)
*C04B 26/06* (2006.01)
*C04B 103/10* (2006.01)
*C04B 111/00* (2006.01)
*C04B 111/60* (2006.01)

(52) U.S. Cl.
CPC ............... *C04B 2103/10* (2013.01); *C04B 2111/00456* (2013.01); *C04B 2111/00568* (2013.01); *C04B 2111/60* (2013.01)

(56) References Cited

U.S. PATENT DOCUMENTS

| | | | | |
|---|---|---|---|---|
| 2002/0002259 A1* | 1/2002 | Quis | ........................ | C09D 4/06 526/323.2 |
| 2005/0028976 A1* | 2/2005 | Nguyen | ................... | C09K 8/80 428/407 |
| 2009/0047437 A1* | 2/2009 | Yoshii | ................. | C08F 220/281 427/407.1 |
| 2009/0253845 A1* | 10/2009 | Neugebauer | ............. | C09D 4/06 524/425 |
| 2012/0189857 A1 | 7/2012 | Matsumoto et al. | | |

OTHER PUBLICATIONS

Translation WO 2005016983 (Year: 2005).*
International Search Report and the Written Opinion Dated Sep. 11, 2020 From the International Searching Authority re. Application No. PCT/EP2020/064774. (12 Pages).
Communication Pursuant to Article 94(3) EPC Dated Feb. 21, 2023 From the European Patent Office Re. Application No. 20727349.1. (5 Pages).

* cited by examiner

GRANULATE MATERIAL AND ASSOCIATED COATING THAT IS LOW IN ODOR AND EMISSIONS, PARTICULARLY A CONSTRUCTION ELEMENT COATING, FOR EXAMPLE A FLOOR COATING, BASED ON A RADICAL POLYMERIZATION

RELATED APPLICATIONS

This application is a National Phase of PCT Patent Application No. PCT/EP2020/064774 having International filing date of May 27, 2020, which claims the benefit of priority of Belgian Patent Application No. 2019/5349 filed on May 28, 2019. The contents of the above applications are all incorporated by reference as if fully set forth herein in their entirety.

FIELD AND BACKGROUND OF THE INVENTION

The present invention relates to a formulation of a granulate material for coatings, particularly construction element coatings, for example floor coatings.

In a second aspect, the present invention comprises a composite granulate material containing the granulate material.

In a third aspect, the present invention relates to a kit for coating a surface with a coating.

In a fourth aspect, the present invention relates to a method for applying a (floor) coating onto a surface.

The present invention relates to a granulate material used for coating formulations based on radical chain-growth polymerization wherein reaction resins are used, and to other aspects of coatings.

Floor coatings are very popular. These coatings often contain sand or gravel or other granulate materials, colored or uncolored, which are bound with a resin and sometimes covered with a topcoat to protect them and prevent water penetration. These granulate materials contribute to the aesthetic, mechanical as well as anti-slip properties of the obtained coating. The associated coating formulations polymerize directly onto the floor under ambient conditions, with a variable being winter or summer conditions. The advantage of coating technology based on radical chain-growth polymerization of methacrylates and/or acrylates (abbreviated to (M)A), is that the coating can be fully cured in a matter of hours, while other coatings, such as those based on step-wise polymerization (epoxy or polyurethane based systems), require a much longer time, usually at least six hours or longer, and thus more on the scale of a working day, which means that the complete construction of a floor—which consists of multiple layers—takes up multiple days.

The processing of reaction resins based on (M)A in the context of floor coatings is usually accompanied by a strong, offensive odor and a significant air-bound toxicity, particularly when significant amounts of high vapor pressure (co) monomer are used, such as methyl methacrylate (MMA). These monomers often also have a low flashing point and thus also increase the costs whenever they are manipulated during production, packaging, transport and application.

Radical chain-growth polymerization of (M)A monomer or co-monomers, whether or not in the presence of oligomer/polymer with tertiary amines, benzoyl peroxide as a radical initiator and wax or paraffin as an oxygen barrier for forming an (M)A-floor coating resin, is a widely applied processing technology for coatings in the construction industry.

A cured coating having the correct formulation exhibits a relatively good chemical resistance against weak acids and bases (which are commonly used, for example in the food industry), UV and wear resistance. However, due to the use of low vapor pressure monomers such as MMA, such coatings present issues relating to odor, monomer emissions, toxicity and flammability, particularly during application of the coating.

Low-odor (M)A coating formulations are known, consisting largely of monomers of slightly higher, but not very high mass, because the inclusion of compounds that are too large, such as too heavy oligomers and polymers, often complicate the application of the coating, particularly in coatings with a low molar mass solvent or in the absence of solvents. Controlling or reducing the odor in many cases also reduces the toxicity, since many of the volatile compounds that are responsible for the odor also contribute to the toxicity.

One problem with low-odor (M)A-reaction resins is oxygen inhibition, leading to premature termination of the polymerization reaction. For example, the radicals formed by the radical initiator at or near the surface react quickly with oxygen from the ambient air and are thereby deactivated. This leads to incomplete polymerization or no polymerization at all, often leaving the surface of such coatings sticky.

When using volatile monomers (i.e. having a vapor pressure of about 3.9 kPa), this is counteracted by adding paraffin or wax. This wax is the, due to the presence of volatile monomers, pushed to the surface layer after a certain degree of reaction, minimizing the paraffin oxygen penetration. This modification may optionally be combined with the dissolving of a polymer in these (volatile) monomers. When the volatile monomer evaporates, this also leads to the formation of a film due to physical drying, which also suppresses the diffusion of oxygen in the coating. Thus, in volatile monomers, the occurrence of oxygen inhibition is strongly suppressed, and a quick curing to sufficiently high monomer conversion is obtained. Such modifications are however not applicable to low-odor (M)A resins, wherein neither volatile monomers nor any other volatile solvents are desirable.

It is therefore far from simple to find a good balance between labor time (application), curing time and minimizing health risks; particularly for low-odor (M)A systems. The need for an alternative method for counteracting the negative effects of oxygen inhibition without requiring the use of volatile monomers or solvents, remains of critical importance.

PRIOR ART

Some improvements were already made concerning the resins for floor coating formulations, particularly by replacing acrylates in the resin with less volatile (M)A monomers, in order to solve the odor problem and the problem of volatility and still have a reasonably quick curing and a wide temperature working range.

American patent publication U.S. Pat. No. 7,049,355 describes a floor coating formulation comprising low-odor (M)A-monomers, optionally supplemented with a prepolymer, a paraffin and/or wax, and a redox system containing an accelerator and a peroxide catalyst or initiator in sufficient amounts. It should be noted that that an (M)A monomer is always present.

American patent publication U.S. Pat. No. 9,657,191 describes a curable, low-odor, liquid coating composition, which is easily applied at room temperature without external heating, usable for example as a process for obtaining coatings for flooring applications, comprising:
  a) a reactive, acrylic based polymer comprising (M)A functional pendant groups
  b) reactive unsaturated monomers, typically acrylic or methacrylic monomers, often polyfunctional monomers;
  c) a thermally or UV-activated radical initiator, and in many embodiments;
  d) an inert and non-polar wax or viscous oil, for example a paraffinic material;
  e) optionally a tertiary amine, for example a tertiary amine accelerator used with a thermally activated radical initiator.

U.S. Pat. No. 9,175,171 also describes reactive methacrylate-based resins, consisting of:
  a) from 0.1 to 15 mass % of (M)A,
  b) from 30 to 50 mass % of methyl methacrylates,
  c) from 15 to 40 mass % of (M)A based polymer and/or oligomers
  d) from 0 to 10 mass % of cross-linking agents
  e) from 0 to 5 mass % of accelerators
  f) other adjuvants and additives.

According to the document in question, these reactive resins form an excellent base for formulations that are commonly used for road markings and floor coatings, and the use of urethane functionalized acrylates noticeably improves the characteristic properties of the reactive resins.

(M)A based reactive resins containing urethane from patent publication U.S. Pat. No. 9,175,171 exhibit a clear reduction in odor, due to the volatile components being partially eliminated. Furthermore, the (M)A resins exhibit a good flexibility combined with a high mechanical stability. They also have good flow properties and excellent surface properties.

Although the text offers a detailed description when it comes to the formation of resins, very little is still described about the use of resins together with granulate materials, and most research was done into the resin component of the coating.

There is, however, a growing demand for more "natural" coatings, such as those already mentioned coating formulations for which the properties and the curing of the resin are not negatively impacted by the presence of the granulate material.

There is a need for a coating formulation which is easily applicable onto a broad selection of substrates, which can easily be manufactured with less or no odor and volatile organic components, and is still applicable to a wide range of different infill materials such as gravel, marble, glass, sand and any other granule type, such as polymer granules.

SUMMARY OF THE INVENTION

Unless defined otherwise, all terms used in the description of the invention, including technical and scientific terms, have the meaning such as they are commonly understood by the person skilled in the art in the technical field of the invention. For a better appraisal of the description of the invention, the following terms are explicitly elucidated.

In the present document, "a", "an" and "the" refer to both the singular and the plural, unless the context clearly suggests otherwise. For example, "a segment" means one or more than one segment.

The terms "comprise", "comprising", "consist of", "consisting of", "provide(d) with", "contain", "containing", "include", "including", "embody", "embodying" are synonyms and are inclusive or open terms indicating the presence of what follows, and not precluding or excluding the presence of other components, characteristics, elements, members, steps, as known from or described in the art.

Numerical intervals given by means of their end points comprise all integers, fractions and/or real numbers between the end points, including those end points.

Within the context of the invention, (meth)acrylate ((M)A) refers to a methacrylate (MA) or an acrylate (A) compound. (Meth)acrylate resin refers to a resin wherein at least one of the co-monomers is an acrylate or a methacrylate by opposition to (MM)A which refer to methyl-methacrylate polymer such as polymethyl methacrylate.

Examples of polyMMA polymers such as polyaniline are disclosed in U.S. Pat. No. 5,254,633 for conductive coating.

The term "cold curing" is interpreted as curable under the climate conditions that are common for applications in the construction industry. A cold curing process allows polymerization until the formation of a solid coating without requiring active heating from external source (e.g. in an oven or with a hot air blower). Moreover, no energy needs to be added by means of radiation not naturally present at the building site, such as e.g. using UV lights or IR lights. The ambient temperature is preferably between 0 and 35° C.,— and the ambient humidity between 0 and 99%. However, due to the reaction heat that is released (and the thin layer thickness of the application), this temperature may locally rise to at most 150° C.

The term "coating formulations", within the present invention, comprises coating formulations for construction elements such as floor or wall coating formulations, worktop surface coating formulations, such as industrial or domestic worktop surfaces, table surfaces, inclined surfaces or driveway coating formulations, swimming pool coating formulations, or any form of coatings.

In a first aspect, the invention relates to a granulate material for a radical chain-growth polymerization based coating formulation comprising at least a granulate material having an average particle size d50 of between 0.1 and 2 mm, measured according to ASTM C136, at least partially coated with at least one component C1, which is an accelerator and/or a radical initiator.

The granulate material is preferably a granulate material for a radical chain-growth polymerization based coating formulation, adapted to minimize inhibition of resin polymerization by ambient air, comprising at least a granulate material having an average particle size d50 of between 0.1 and 2 mm, measured by ASTM C136, selected from the group consisting of (i) apolar granulate materials having a contact angle with water of 35° or more, preferably of 55° or more, when measured according to the norm DIN 55660-2:2011-12, at least partially coated with at least one component C1, which is an accelerator and/or a radical initiator, wherein the amount of component C1 is more than 0.2 g/m$^2$ of apolar granulate material surface area, or (ii) granulate materials coated with at least one component C1, which is an accelerator and/or a radical initiator, wherein the amount of component C1 is sufficient to be suitable for enabling a resin polymerization which takes place faster than the inhibition by ambient conditions, with the amount of C1 typically being higher than 4 g/m$^2$ and 10 g/m$^2$, and mixtures thereof.

It has indeed proved possible according to the present invention to solve at least part of the previously mentioned issues by using a granulate material which can be used with different resin formulations, and which also contributes to lower the emission of odors and volatile components, as well as simplifying the application of the floor coating formulation.

The granulate material according to the present inventions preferably has a contact angle of 35° or more, preferably of 55° or more, when measured with water according to DIN 55660-2:2011-12, causing a difference of polarity between the granulate material and the different types of resins and facilitates application.

According to the present invention, the term "measured with water according to DIN 55660-2:2011-12" mean that the contact angle between water and an individual sand granule was measured with minimal variation, due to the small diameters of the granulate materials. More in particular, ten individual sand granules were placed under a microscope. One drop of water was added to each sand particle, using a piezo dispenser. The average volume of the water drops was 78 pL±0 pL (in flight). The surface tension of the test liquid (water) was 72.66 mN/m. The image angle of the camera was set to +2°. The circumference of the drop was measured according to the ellipse fitting method. The static contact angle was measured at 30-105 ms after adding the water drop, which is the moment where the shape of the drop is in equilibrium and evaporation has not yet affected the shape. Each individual drop was measured once.

According to the present invention, the amount of C1 expressed in grams (g) per square meter ($m^2$) of granulate material surface area is measured by removing the component C1 from the granulate material using a suitable solvent. If, in addition to the component C1, other components are also removed (e.g. apolar wax or desiccant if present), a suitable chemical analysis technique should be used to determine the amount of C1 in the mixture of C1, solvent and other components, e.g., HPLC.

In addition to the mass of the component C1, the granulate material surface area of the granulate materials should also be determined. The granulate material surface area is calculated by first performing a sieve analysis according to ASTM C136. Then, the specific surface area of every sieve fraction is determined by describing the granulate materials as spherical particles having a same density as the base material of the granulate material (e.g. 2650 kg/$m^3$ in the case of quartz granulate materials) and having a diameter equal to the average value of the lower and upper sieve mesh sizes. The total granulate material surface area is obtained by adding together the granulate material surface areas of the different sieve fractions.

Indeed, with known coating formulations, when the coating is applied onto an existing substrate, the first step is mixing the different components of the resin and applying the mixture in the form of a layer onto the existing substrate. The mixture of the different components may also contain a filler, or the filler may be applied on top of the resin layer. Later, the granulate material is applied onto the surface.

The present invention shows that it is possible to use an apolar granulate material, preferably having a specific polarity represented by a contact angle with water of 35° or more, preferably of 55° or more, which is partially coated with a component C1, which is an accelerator or an initiator, resulting in a coating formulation that is easier to apply and wherein the polymerization can be controlled and, if so desired, can be delayed until after the addition of the granulate material, and which may be used for different types of resins.

Furthermore. the component C1 and/or the polarity of the apolar granulate material, owing to the sufficiently small relative distance of the different particles of granulate material when they are applied onto the surface to be covered, ensure a quick reaction at the coating surface, thus forming a barrier against oxygen inhibition. Of course, the amount of component C1 in the partial coating of the apolar granulate material should be chosen with care, to enable a quick polymerization at the surface between the granulate materials.

The present invention thus relates to a self-regulating process to prevent oxygen inhibition in coating formulations based on radical chain-growth polymerization for coating (construction) surfaces such as e.g. floors, walls, columns, staircases, etc. . . . , with the possibility of preventing volatile monomers, so that the resulting coating is low in odor and emissions.

Indeed, the component C1 is present in this partial coating and should be coated around the granulate materials in such a way that it remains at least partially available at the surface of the granulate material so as to be able to react with the components of the coating formulation at the time the granule is applied in the vicinity of the liquid surface.

The granulate materials comprised in the present invention are only present in a thin layer at the surface after spreading. They may further be, and commonly are included at least partially into the bulk mixture of components of the resin.

The granulate materials have an average particle size $d_{50}$ between 0.1 and 2 mm, which means that the granulate material in a preferred embodiment has a diameter between 0.1 and 2 mm, preferably between 0.2 and 2 mm, even more preferably between 0.3 and 1.5 mm, even more preferably between 0.4 and 1.2 mm, most preferably between 0.4 and 0.8 mm.

Fine-tuning the granule diameter, particularly avoiding overly large or small granules, allows the oxygen inhibition to be optimally minimized, with the diameter preferably chosen so that any non-covered portions of the surface are no larger than 3 $mm^2$, preferably smaller than 1 $mm^2$.

Due to the apolarity of the granulate materials of the invention, or to the sufficient presence of the component C1, the capillary action of the mixture is impeded, and the rising of resin between the particles of granulate material is limited.

In a preferred embodiment of the present invention, the amount of component C1 of the apolar granulate materials (i) having a contact angle with water of 35° or more, is smaller than 5 g/$m^2$ of apolar granulate material surface area.

In another preferred embodiment of the present invention, the amount of component C1 of the granulate materials (ii) is smaller than 10 g/$m^2$ of apolar granulate material surface area.

In yet another preferred embodiment of the present invention, the apolar granulate material contains at least apolar granules and/or at least particles of granulate material which are at least partially coated with an apolar composition such as paraffin or wax.

In a further preferred embodiment according to the present invention, the at least present granulate material has a particle size $d_{30}$ of between 0.4 and 0.8 mm and/or a particle size $d_{70}$ of between 0.8 mm and 1.2 mm.

Preferably, the apolar composition, such as for example paraffin or wax, is selected from the group comprising linear or branched hydrocarbons of the general formula $C_nH_{2n+2}$, wherein n has a value of between 10 and 70, and an iso- and cycloalkanes/paraffins content of from 0 to 60%; microcrystalline wax; coatings of polymers such as polyethylene, polypropylene, PTFE; carnauba wax; beeswax; lanolin; whale oil; a polyolefin wax; ceresin; candelilla wax and a mixture of these waxes.

Fully refined and isolated waxes are preferred for use in the(M)A resins of the invention for surface coating. The use of paraffin further offers the advantage that this material, combined with (M)A resins, is already well known.

For example, document US2012/189857 disclose the use of radical-curable resins (urethane methacrylate resin) in a primer with which a waterproof material containing a wax and a curing accelerator, can be used for improving crack-load-following capability, blistering resistance, adhesiveness.

On the one hand, the use of paraffin or wax lowers the amount of accelerator required, and by varying the polarity of the granulate materials, the capillary action can be suppressed. On the other hand, the capillary action can be counteracted by significantly higher amounts of accelerator. In that case, the higher amount of radicals formed from the redox reaction compensates for the oxygen present. Note that when there is too much capillary action, the granulate material is wetted with a thin layer of resin which remains susceptible to oxygen inhibition.

In a preferred embodiment of the present invention, component C1 comprises at least one accelerator. The accelerator is a chemical component that can react with a radical initiator for forming radicals at room temperature, and is preferably selected from the group of amines, more preferably tertiary amines or ammonium salts and mercaptans such as for example N,N-Dimethyl-p-toluidine, N,N-dimethyl aniline, benzyl dimethyl amine, N,N-dihydroxy ethyl-p-toluidine (DHEPT), N-(2-hydroxyl ethyl)-N-methyl-para-toluidine, para-toluidine ethoxylate (PTE), 2-(4-dimethyl amino phenyl)ethanol (DMAPEA), 1,1'-(p-tolyl imino) dipropan-2-ol, 2,4,6-tris(dimethyl amino methyl)phenol, 2-[(dimethyl amino)methyl]phenol, N,N-diethyl aniline, dimethyl ethanol amine, 2-diethyl amino-ethanol, bis-(2-dimethyl aminoethyl)ether, pentamethyl diethylene tri-amine, N-ethyl morpholine, N-methyl morpholine, 4-(2-Hydroxyethyl) morpholine, dimethyl piperazine, 4-(dimethyl amino)benzyl alcohol, 4-dimethyl amino benzyl methacrylate, 4-(dimethyl amino)phenyl ethanoic acid, 2-ethylhexyl 4-(dimethyl amino)benzoate, ethyl 4-(dimethyl amino)benzoate, 4-(N,N-dimethyl amino)phenethyl alcohol and 2-(4-(Dimethyl amino)phenyl)ethanol and their mixtures, even more preferably benzyl dimethyl amine, N,N-dihydroxy ethyl-p-toluidine (DHEPT), N-(2-hydroxyl ethyl)-N-methyl-para-toluidine, para-toluidine ethoxylate (PTE).

It is possible to coat the infill granule with an initiator as opposed to an accelerator. This way, too, a polymer layer can be formed that shields the (M)A-resin being formed from the ambient air. Here, an initiator should be chosen that is sufficiently stable at room temperature. Thus, in another preferred embodiment of the invention, component C1 comprises at least one initiator that is preferably selected from the group comprising peroxides such as a ketone peroxide, a diacyl peroxide, a perester, a per-ketal, such as methyl ethyl ketone peroxide, acetylacetone peroxide, dilauroyl peroxide, ketone peroxide, methyl isobutyl ketone peroxide, cyclohexanone peroxide, dibenzoyl peroxide, tert-butyl peroxy benzoate, tert-butyl peroxy isopropyl carbonate, 2,5-bis-(2-ethylhexanoylperoxy)-2,5-dimethylhexane, tert-butyl peroxy-2-ethylhexanoate, tert-butyl peroxy-3,5,5-trimethyl-hexanoate, 1,1-bis (tert-butyl peroxy) cyclohexane, 1,1-bis-(tert-butyl peroxy)-3,3,5-trimethyl cyclohexane, cumyl hydroperoxide, tert-butyl hydroperoxide, dicumyl peroxide, bis-(4-tert-butylcyclohexyl) peroxide carbonate, and more preferably dibenzoyl peroxide and dilauroyl peroxide, which are commercially available in a powder form which may contain a form of plasticizer, and a mixture thereof.

Preferably, the granulate material for the coating formulation is packaged in a bag, wherein at most 41.5% of the volume in the bag is air. Granulate materials that may be packaged in such a compact form are also capable of sufficiently covering the liquid surface of the coating formulations based on radical chain-growth polymerization.

Preferably, the particles of granulate material are selected from mineral particles or organic particles. Some examples are quartz, metal carbides, sand, metal particles, marble, dolomite, glass, ceramics, or wherein the granules are polymeric granules such as polyethylene, polypropylene, polyethylene terephthalate, poly(methyl methacrylate), polyurethane, natural or synthetic rubber.

In a preferred embodiment, the granulate material is a colored granulate material.

In this preferred embodiment, the granulate material, before being provided with an accelerator (component C), is additionally provided with a surface coating. This surface coating may, among other things, contain pigments. In this way, the surface can be provided with a desired color or color effect.

These colored granulate materials are commercially available or can be produced from sand or quartz granules, as described in patent application BE 2018/5725, incorporated herein by way of reference, which are to be further coated with wax or paraffin and component C1.

Preferably, the granulate material is further coated with a desiccant, preferably selected from silicon dioxide (silica) based products or hydrated amorphous sodium aluminum silicates, for example in an amount of 0.05 to 2 m %.

Other embodiments of the granulate material are further described in the claims.

In a second aspect, the present invention also relates to a composition of granulate material for a coating formulation, comprising at least one granulate material (i) or (ii) according to the present invention. For example, a composition of granulate materials according to the present invention, which may be of the same size or not, and which may be of the same color or not.

Other embodiments of the composition of granulate material according to the present invention are mentioned in the appended claims.

In a third aspect, the present invention relates to a coating formulation kit comprising:
a) At least one granulate material having an average particle size d50 of between 0.1 and 2 mm, measured according to ASTM C136
b) At least one component C1 which is an accelerator and/or a radical initiator,
c) A base coat kit, comprising at least one component C2 which is the same or is not the same as component C1, which is an initiator or accelerator, further comprising at least one liquid resin, said liquid resin comprising at least 30 m % of at least one vinyl group containing monomer, polymer or oligomer or a mixture thereof.

Preferably, in the present coating formulation kit, at least one accelerator is present in an amount of at least from 0.01 to 10 m %, for example from 0.01 to 5 m %, preferably from 0.05 to 1.55 m %, based on the mass of the liquid resin, either on the apolar composite granulate material or in the base coat kit or both, further containing at least from 0.1 to 10 m %, preferably from 0.5 to 6.5 m % of at least one redox-initiating radical initiator based on the mass of the liquid resin, either on the granulate material (i) or granulate material (ii) or in the base coat kit or all three.

Preferably, the granulate material is a granulate material according to the present invention as described in the first aspect above, or a composition of granulate material as described in the second aspect.

The granulate materials according to the invention, i.e. the granulate material which also contains a component C1, which can react by means of a redox reaction with the component C2. The component C2 may be sold in a mixture with the liquid resin or may be packaged as a separate component to be mixed with the liquid resin immediately before use.

The granulate materials according to the present invention will, once they are put into contact with the coating formulation, give off the component C1, starting along the surface that reacts with the component C2 that is mixed into the liquid resin and initiates the polymerization. Together, component C1 and component C2 form a pair of at least one accelerator and at least one initiator. As a result, a polymer layer is quickly formed in the vicinity of the liquid resin surface as soon as the latter is covered with granulate materials. This polymer layer screens the coating further from oxygen from the surroundings. That way, the granulate materials solve the problem of inhibition by ambient air. The result is that the granulate materials allow a quick, but controlled and cold curing of low-odor coatings.

In practice, then, the following possibilities exist concerning the composition of component C1 and C2:

(i) Component C1 Comprises One or More Accelerators:
Component C2 comprises at least an initiator and preferably also an accelerator. Here, for example, only the accelerator may already be present in the liquid resin. In that case, the initiator is a separate component of the base coat kit and is to be mixed with the liquid resin immediately before the coating is applied onto the surface to be coated. This is the preferred embodiment. It is also possible to mix the initiator into the liquid resin and to supply the accelerator as a separate component in the base coat kit, although such a kit usually has a limited shelf life in time. If the component C2 does not contain an additional accelerator, and thus only contains an initiator, then that, too, is preferably supplied as a separate component, and it should further be ensured that the liquid resin is of sufficiently low viscosity and that the layer thickness of the coating is limited, so that the granulate materials can sink to the bottom of the coating.

(ii) Component C1 Comprises One or More Initiators:
Component C2 comprises at least an accelerator and preferably also an initiator. Here, the accelerator may already be present in the liquid resin. In that case, the initiator is a separate component of the base coat kit and is to be mixed with the liquid resin immediately before the coating is applied onto the surface to be coated. This is the preferred embodiment. It is also possible to mix the initiator into the liquid resin and to supply the accelerator as a separate component in the base coat kit, although such a kit usually has a limited shelf life in time. If the component C2 does not contain an additional initiator, it should be ensured that the liquid resin is of sufficiently low viscosity and that the layer thickness of the coating is limited, so that the granulate materials can sink to the bottom of the coating.

(iii) Component C1 Comprises an Accelerator and an Initiator:
Component C2 may contain at least one of the same components as C1, or an additional accelerator or an additional initiator. If component C2 contains another initiator, it is again preferred to supply the latter as a separate component.

Preferably, the amount of C1 is as low as possible, for reasons both economical and aesthetic. This is because aromatic accelerators may be susceptible to discoloration under the influence of UV light and temperature. The use of a sufficiently low amount of C1 alleviates this problem.

In a preferred embodiment, the granulate materials, for example infill granules, have a diameter of between 0.1 and 2 mm, preferably between 0.2 and 2 mm, even more preferably between 0.3 and 1.5 mm, even more preferably between 0.4 and 1.2 mm, most preferably between 0.4 and 0.8 mm. Fine-tuning the granule diameter, particularly avoiding granulate materials or granules that are too large, allows an optimal minimalization of the oxygen inhibition while ensuring dryability. It is however possible to use granulate materials with larger diameters combined with granulate materials having smaller diameters.

In a preferred embodiment, a mixture of granulate materials with different diameters is used.

In a further preferred embodiment, granulate materials having a diameter of between 0.2 and 0.8 mm can be combined with infill granules having a diameter of more than 0.8 mm. For example, 30 m % of infill granules having a diameter of between 0.4 and 0.8 mm and 70 m % of infill granules having a diameter of between 0.8 mm and 1.2 mm yields sufficient coverage and satisfactory results.

In this preferred embodiment, the granulate material is also a colored granulate material. In that way, the floor surface may be provided with a desired color or color effect. For a homogenous color, pigments will also be added to the liquid resin. Furthermore, the use of carefully selected floor granule distributions, or floor granules having an irregular surface, may create a "matte" color effect, which may optionally remain visible despite the addition of a topcoat. This is due to the irregular refraction of light on the floor granules.

When the component C2 contains at least one initiator, it is preferably selected from the group comprising peroxides such as a ketone peroxide, a diacyl peroxide, a perester, a per-ketal, such as methyl ethyl ketone peroxide, acetylacetone peroxide, dilauroyl peroxide, ketone peroxide, methyl isobutyl ketone peroxide, cyclohexanone peroxide, dibenzoyl peroxide, tert-butyl peroxy benzoate, tert-butyl peroxy isopropyl carbonate, 2,5-bis-(2-ethylhexanoylperoxy)-2,5-dimethylhexane, tert-butyl peroxy-2-ethyl hexanoate, tert-butyl peroxy-3,5,5-trimethylhexanoate, 1,1-bis (tert-butyl peroxy) cyclohexane, 1,1-bis-(tert-butyl peroxy)-3,3,5-trimethyl cyclohexane, cumyl hydroperoxide, tert-butyl hydroperoxide, dicumyl peroxide, bis-(4-tert-butylcyclohexyl) peroxide carbonate, and more preferably dibenzoyl peroxide and dilauroyl peroxide which may contain a form of plasticizer, and a mixture thereof.

When the component C2 contains at least one accelerator, it is preferably selected from the amine group, more preferably tertiary amines or ammonium salts and mercaptans, such as for example N,N-Dimethyl-p-toluidine, N,N-dimethyl aniline, benzyl dimethyl amine, N,N-dihydroxy ethyl-p-toluidine (DHEPT), N-(2-hydroxyl ethyl)-N-methyl-para-toluidine, para-toluidine ethoxylate (PTE), 2-(4-dimethyl amino phenyl)ethanol (DMAPEA),1,1'-(p-tolyl imino) dipropan-2-ol, 2,4,6-tris(dimethyl amino methyl)phenol, 2-[(dimethyl amino)methyl]phenol, N,N-diethyl aniline, dimethyl ethanol amine, 2-diethyl amino-ethanol, bis-(2-dimethyl aminoethyl)ether, penta methyl diethylene triamine, N,N,N',N'',N''-pentamethyl-dipropylene triamine, N-ethyl morpholine, N-methyl morpholine, 2,2'-dimorpholinodiethylether, 4-(2-Hydroxyethyl) morpholine, dimethyl piperazine, 4-(dimethyl amino)benzyl alcohol, 4-dimethyl amino benzyl methacrylate, 4-(dimethyl amino)phenyl ethanoic acid, 2-ethylhexyl 4-(dimethyl amino)benzoate, ethyl 4-(dimethyl amino)benzoate, 4-(N,N-dimethyl amino) phenethyl alcohol and 2-(4-(Dimethyl amino)phenyl)ethanol, triethanolamine and mixtures thereof.

As a tertiary amine (E), an aromatic tertiary amine is preferred. As the aromatic tertiary amine, an aromatic tertiary amine having at least one aromatic residual group directly bound to a nitrogen atom is preferred. As an aromatic tertiary amine, N,N-Dimethyl-p-toluidine, N,N-dimethyl aniline, N,N-diethyl-p-toluidine, N-(2-hydroxyethyl)N-methyl-p-toluidine, N,N-di(2-hydroxyethyl)-p-toluidine, or N,N-di(2-hydroxypropyl)-p-toluidine; or an ethylene oxide adduct or a propylene oxide adduct on N,N-di(2-hydroxyethyl)-p-toluidine, or an ethylene oxide adduct or a propylene oxide adduct on N,N-di(2-hydroxypropyl)-p-toluidine may be used.

Furthermore, the aromatic tertiary amine is not limited to a para substituted component, but may also be an ortho substituted or a meta substituted component.

As tertiary aromatic amine, N,N-dimethyl-p-toluidine, N,N-diethyl-p-toluidine, N,N-di(2-hydroxyethyl)-p-toluidine, or N,N-di(2-hydroxypropyl)-p-toluidine are preferred, due to their reactivity and beneficial effect on the curing of the composition.

The preferred accelerators are N,N-dihydroxy ethyl-p-toluidine (DHEPT) and para-toluidine ethoxylate (PTE). These are chosen for their low toxicity, low odor and sufficiently fast action, combined with the preferred radical initiators, such as benzoyl peroxide (BPO). Note that any accelerators present on the granulate materials as component C1 need not be chemically identical to the optional accelerator present in component C2.

The component C2 is commonly used in an amount ranging from 0.1 to 10 m %, preferably from 0.5 to 6 m % based on the total mass of the mixture of the liquid resin. The effective amount is to be chosen so that after applying the granulate materials, an oxygen barrier is formed after limited reaction due to polymerization within 30 min after applying the granulate materials, preferably within 10 min. Moreover, the concentration should be chosen so that the coating has a processing time (=the available time for applying the coating before the granulate materials are to be spread over the liquid surface) of a few minutes to a matter of hours, preferably between 5 min to 200 min, even more preferably between 5 min and 60 min, most preferably between 5 min and 30 min.

In a preferred embodiment of the present invention, in the mixture of at least one vinyl group containing monomer, polymer or oligomer, at least 40 mass % of the (co) monomers are (M)A based, for example esters of acrylic acid or methacrylic acid.

Indeed, esters of acrylic acid or methacrylic acid are suitable for the use combined with the granulate materials/ infill granules. For obtaining a coating that is low in odor emissions, only those with a sufficiently low vapor pressure at room temperature can be taken into account. Preferably, the liquid resin has a vapor pressure of less than 0.1 kPa at 20° C., even more preferably less than 0.05 kPa at 20° C., and yet more preferably less than 0.01 kPa at 20° C.

Although, as opposed to more traditional coating formulations that use paraffine or wax as an oxygen barrier the self-regulating process against oxygen inhibition allows for the use of low vapor pressure monomers (up to 100% of the monomers used) while not being not limited by this vapor pressure or boiling point of the monomers used.

Examples of acrylates that may be used within the scope of protection of the invention are, but are not limited to, alkyl acrylates such as bis-2-methylacrylic acid ester (iso-crotonic acid ester), trans-2-methylacrylic acid ester (iso-crotonic acid ester); aryl acrylates such as substituted benzyl acrylates; or unsaturated alkyl acrylates such as for example allyl acrylate.

Methacrylates that may be used in the context of the invention comprise, but are not limited to, alkyl methacrylates derived from saturated alcohols such as isopropyl methacrylate, propyl methacrylate, n-butyl methacrylate, tert-butyl methacrylate, n-hexyl methacrylate, n-octyl methacrylate, n-decyl methacrylate, isooctyl methacrylate, tetradecyl methacrylate, etc.; alkyl methacrylates derived from unsaturated alcohols such as oleyl methacrylate, 2-propynyl methacrylate, allyl methacrylate, vinyl methacrylate, etc.; amides and nitriles of methacrylic acid such as, but not limited to, N-(methyl aminopropyl) methacryl amide, N-(diethyl phosphono) methacryl amide, 1-methacryloylamido-2-methyl-2-propanol, N-(3-dibutylaminopropyl) methacryl amide, N-butyl-N-(diethyl phosphono) methacryl amide, N,N-bis (2-diethyl aminoethyl) methacryl amide, 4-methacryloylamido-4-methyl-2-pentanol, methacryloyl amido acetonitril, N-(methoxymethyl) methacryl amide, N-(2-hydroxyethyl) methacryl amide, N-acetyl methacryl amide, N-(dimethyl aminoethyl) methacryl amide, N-methyl-N-phenyl methacryl amide, N,N-dimethyl methacryl amide, N-methyl methacryl amide, N,N-dimethyl methacryl amide, N-isopropylinethacrylamide; amino alkyl methacrylates such as tris (2-methacryloxyethyl) amine, N-methyl formamido ethyl methacrylate, 3-diethyl aminopropyl methacrylate, 2-ureidoethyl methacrylate; other nitrogen containing methacrylates such as N-(methacryloyl oxyethyl) diisobutyl ketimine, 2-methacryloyl oxyethyl methyl cyamide, cyanomethyl methacrylate; aryl methacrylates such as nonyl phenyl methacrylate, benzyl methacrylate, phenyl methacrylate, wherein the aryl residue in each case may be substituted; carbonyl containing methacrylates such as 2-carboxyethyl methacrylate, carboxymethyl methacrylate, N-(2-methacryloyl oxyethyl)-2-pyrrolidinone, N-(3-methacryloyl oxypropyl)-2-pyrrolidinone, N-methacryloyl morpholine, oxazolidinyl ethyl methacrylate, N-(methacryloyl oxy) formamide, acetonyl methacrylate, N-methacryloyl-2-pyrrolidinone; cycloalkyl methacrylates such as 3-vinylcyclohexyl methacrylate, 3,3,5-trimethyl cyclohexyl methacrylate, bornyl methacrylate, cyclopenta-2,4-dienyl methacrylate, isobornyl methacrylate, 1-methyl cyclohexyl methacrylate; glycol dimethacrylates such as 1,4-butanediol methacrylate, methylene methacrylate, 1,3-butanediol methacrylate, triethylene glycol methacrylate, 2,5-dimethyl-1,6-hexanediol-methacrylate, 1,10-decaandiolmethacrylate, 1,2-propanediol methacrylate, diethylene glycol methacrylate, ethylene glycol methacrylate; hydroxyalkyl methacrylates such as 3-hydroxypropyl methacrylate, 3,4-dihydroxybutyl methacrylate, 2-hydroxyethyl methacrylate, 2-hydroxypropyl methacrylate; methylacrylates of ether alcohols such as tetrahydrofurfuryl methacrylate, vinyloxy ethoxy ethyl methacrylate, methoxy ethoxy ethyl methacrylate, 1-butoxypropyl methacrylate, 1-methyl-(2-vinyloxy) ethyl methacrylate, cyclohexyl oxymethyl methacrylate, methoxy methoxy ethyl methacrylate, benzyloxymethyl methacrylate, furfuryl methacrylate, 2-butoxyethyl methacrylate, 2-ethoxyethoxymethyl methacrylate, 2-ethoxy ethyl methacrylate, allyloxy methyl methacrylate, 1-ethoxybutyl methacrylate, methoxymethyl methacrylate, 1-ethoxy ethyl methacrylate, ethoxy methyl methacrylate; methacrylates of halogenated alcohol groups such as 2,3-dibromopropyl methacrylate, 4-bromophenyl methacrylate, 1,3-dichloro-2-propyl methacrylate, 2-bromoethyl methacrylate, 2-iodoethyl methacrylate, chloromethyl methacrylate;

oxiranyl methacrylates such as 10,11-epoxyundecyl methacrylate, 2,3-epoxycyclohexyl methacrylate, 2,3-epoxybutyl methacrylate, 3,4-epoxybutyl methacrylate, glycidyl methacrylate; phosphorous, boron and/or silicon containing methacrylates such as 2-(dibutyl phosphono) ethyl methacrylate, 2,3-butylene methacryloyl ethyl borate, 2-(dimethyl phosphate) propyl methacrylate, methyl diethoxy methacryloyl ethoxy silane, 2-(ethylene phosphito) propyl methacrylate, dimethyl phosphinomethyl methacrylate, dimethyl phosphonoethyl methacrylate, diethyl methacryloyl phosphonate, diethyl phosphatethyl methacrylate, dipropyl methacryloyl phosphate; sulphur containing methacrylates such as ethyl sulphinyl ethyl methacrylate, 4-thiocyanatobutyl methacrylate, ethyl sulphonyl ethyl methacrylate, thiocyanatomethyl methacrylate, methyl sulphinyl methyl methacrylate, bis (methacryloyl oxyethyl) sulfide; trimethacrylates such as trimethyloyl propane trimethacrylate.

The compounds listed may also be used as co-monomer mixtures. Methacrylates and acrylates where the alcohol residue contains 3 to 5 carbon atoms are preferred.

Particularly preferred (meth)acrylates comprise, but are not limited to, triethylene glycol dimethacrylate, dipropyleneglycol diacrylate, 1,4-butanediol dimethacrylate, hexanediol diacrylate, 1,4-butanediol dimethacrylate, hexanediol diacrylate, 1,4-butanediol dimethacrylate, hexanediol diacrylate, 1,4-butanediol dimethacrylate, hexanediol diacrylate, 1,4-butanediol dimethacrylate, ethylene (glycol) dimethacrylate, ethoxylated bisphenol A dimethacrylate, ethoxylated bisphenol A diacrylate, lauryl acrylate, dodecyl acrylate, lauryl methacrylate, stearyl methacrylate, octadecyl methacrylate, tetradecyl acrylate, ethyl triglycol methacrylate, butyl diglycol methacrylate, isodecyl methacrylate, decyl methacrylate, isodecyl methacrylate, isobornyl methacrylate, 2-propylheptylacrylate, dihydrodicyclopentadienyl acrylate, cyclic trimethylolpropane formal acrylate, 2-ethylhexyl methacrylate, 2-fenoxy ethyl acrylate, phenol (EO) acrylate, 2-ethylhexylacrylate, benzyl methacrylate, cyclohexyl methacrylate, hydroxypropyl methacrylate, butanediol monoacrylate, dimethyl aminoethyl acrylate, hydroxyethyl methacrylate, isobutyl acrylate, tertiary butyl acrylate, glacial methacrylic acid, dodecyl acrylate, stearyl methacrylate, octadecyl methacrylate, propoxylated 3,5-glyceryl triacrylate, benzyl methacrylate, 2-dimethyl aminoethyl methacrylate, isobornyl acrylate, isobutyl methacrylate, n-butyl methacrylate and mixtures thereof.

Moreover, the liquid resin may also contain other co-monomers that can be copolymerized with the (meth)acrylates listed above. These comprise, but are not limited to, a vinyl ester, vinyl chloride, vinylidene chloride, vinyl acetate, styrene, a substituted styrene with an alkyl substituent in the side chain, such as α-methyl styrene. Substituted styrenes with an alkyl substituent on the ring, such as vinyl toluene and p-methyl styrene, halogenated styrenes such as a monochlorostyrene, a dichlorostyrene, a tribromostyrene and a tetrabromostyrene; a vinyl- and isopropenyl ether, a maleic acid derivative such as maleic acid anhydride, methyl maleic acid anhydride, maleimide, methylmaleimide, phenyl maleimide and cyclohexyl malic acid imide; and dienes, such as for example 1,3-butadiene and divinyl benzene.

The liquid resin preferably also contains polymers or oligomers, for example based on acrylic monomers but not limited thereto. These polymers reduce the shrinkage of the coating during curing. Furthermore, they can also improve the mechanical properties. The polymers may also be used to increase the viscosity of the liquid resin. In a preferred embodiment, 5 to 30% m of polymer, relative to the total mass of the liquid resin, is present in the liquid resin. Note, however, that the presence of polymer is not necessary for reducing oxygen inhibition in the self-regulating process. The process, in other words, also allows a coating formulation to be formed in which no or little polymers or oligomers are present, allowing the liquid resin to have a lower viscosity than the existing formulations based on volatile monomers.

Preferably, according to the present invention, the base coat kit, preferably the liquid resin, further contains one or more conventional additives, for example an anti-static agent, an antioxidant, a bio stabilizer, antibacterial agents, a chemical blowing agent, a flame retardant, a lubricant flow improving agent, a lubricant, an inhibitor, a light stabilizing brightening agent, a UV stabilizer, an organic phosphate, an oil, a pigment, an impact strength enhancing agent, a reinforcing agent, a reinforcing fiber, a sedimentation agent, a wear protection agent or a plasticizer. Preferably, however, no solvents or solving agents, e.g. volatile solvents that are removed by evaporation during or after the application and before or during curing.

In a preferred embodiment of the invention, the basecoat kit also contains at least one filler in an amount of 2 to 4.5 times the mass of the mixture of the liquid resin. for example, quartz, barium sulphate, calcium carbonate, dolomite felspar, mica, glass powder, talk, cristobalite, silica, . . . . This filler may be provided as a separate component in the basecoat kit or can be mixed with the liquid resin in advance. The use of a filler is particularly advisable when the layer thickness of the intended coating is larger than 1 mm. A filler notably makes the coating less expensive. There are also, however, several technical advantages. For instance, a filler is not reactive, and thus will not expand upon reaction. Shrinkage in the coating will therefore be limited. Further, the filler will also partially absorb the reaction heat. This is advantageous for controlling the polymerization kinetics. The use of a suitable filler is therefore advisable.

In a preferred embodiment, the composite apolar granulate materials, the liquid resin, the filler and the initiator of the component C2 are each packaged separately. The accelerator of the component C2, if present, is preferably admixed, on site or not, into the liquid resin.

The coating formulation kit according to the present invention preferably further contains another extra kit selected from a primer kit, a topcoat kit and the combination of both.

Other embodiments of the floor coating formulation kit according to the present invention are mentioned in the claims.

In a fourth aspect, the invention comprises a process for applying a coating onto a surface. The coating contains granulate materials and a liquid resin with a less pronounced odor, less toxicity, a reduced flammability, faster curing and a better balance between labor time and curing time. These improvements may be found in the coating formulations of the present invention together with the durable and efficient production of coating films with good chemical and physical properties.

The process of the present invention is a self-regulating process to prevent oxygen inhibition in radical polymerization during application of cold curing coatings for coating construction elements.

To this end, the present invention comprises a process for applying a radical chain-growth polymerization based coating formulation kit according to the invention onto a surface, comprising the following steps:
(i) mixing components of the base coat kit
(ii) applying the base coat onto the surface,
(iii) distributing at least one granulate material (i) or (ii) according to the present invention over the surface of the previously applied base coat mixture, and
(iv) curing the base coat so as to form the coating on a surface.

In order to counteract oxygen inhibition, and thus premature termination of the cold curing, the formulation should be applied according to the following method.

The components of the base coat are mixed together. Depending on the size of this mixture, the instrument suited to this end should be used.

Preferably, the surface is a substrate and the application occurs within 60 min from the mixing of components of the base coat kit, at a thickness of 0.2 to 10 mm.

Once components of the base coat have been mixed, this mixture should be applied within 2 hours onto the construction surface to be coated. The layer thickness varies depending on the type of construction element and the intended application, but may for example be comprised between 0.2 and 10 mm.

Preferably, any non-covered portions of the surface are no larger than 3 $mm^2$, preferably smaller than 1 $mm^2$.

Once the mixture has been applied onto the construction surface to be coated, the granulate materials according to the present invention should be applied within 2 hours at the surface of the coating in contact with the air. This may be carried out either by hand or by machine. It is important, however, for the surface to be sufficiently covered with infill granules, with any non-covered portions being no larger than 3 $mm^2$.

Once the surface is sufficiently covered with the composite granulate materials according to the present invention, a self-regulating process comes into effect with the purpose of minimizing oxygen inhibition. The component C1 available on the composite granulate materials that is present at the surface leads to a quick reaction with the component C2 that is present in the mixture of the base coat. According to the present invention, the step of distributing at least one granulate material (i) or (ii) as recited above over the surface of the previously applied base coat mixture is required and possible only because the liquid resin comprising at least 30 m % of at least one vinyl group containing monomer, polymer or oligomer or a mixture thereof has a low vapor pressure, i.e. preferably less than 0.1 kPa at 20° C., even more preferably less than 0.05 kPa at 20° C., and yet more preferably less than 0.01 kPa at 20° C. Indeed, the base coat according to the present invention is (M)A based and not (MM)A based). In the contrary, performing a mix of the granulate material with the base coat before applying the mixture on the ground is not possible. Indeed, if one mixes the granulate directly into the resin, the reaction will start very fast, and one will not have enough time to spread it over the floor. Further, the result might still be rather sticky and tacky as there will be a lot or resin above the granulates in direct contact with oxygen from the air.

The concentrations of the component C1 on the composite granulate materials according to the present invention and the component C2 in the mixture of the basecoat may be determined in such a way that a solid polymer film is formed at the surface. This leads to a sealing surface layer, causing oxygen inhibition to be prevented in another process method than that intended for formulations with volatile monomers and optionally paraffin.

As previously mentioned, the following options are provided:

Component C1 comprises at least one accelerator, component C2 comprises at least one initiator, component C1 and component C2 together comprise at least one initiator and one accelerator.

Component C1 comprises at least one initiator, component C2 comprises at least one accelerator, component C1 and component C2 together comprise at least one initiator and one accelerator.

Component C1 comprises an accelerator and an initiator, and component C2 may also comprise an additional accelerator or an additional initiator.

This self-regulating process according to the present invention therefore does not involve the evaporation of volatile monomers or solvents to form an oxygen barrier, and hence allows a much wider range of monomers as well as monomer/polymer and monomer-oligomer mixtures to be used as a mixture of at least one vinyl group containing monomer, polymer or oligomer. Since the volatility of the monomers in the mixture of at least one vinyl group containing monomer, polymer or oligomer is not a requirement for this novel process, the selection of the monomers in the mixture of at least one vinyl group containing monomer, polymer or oligomer may take place based on other criteria, such as odor, price, toxicity, mechanical properties of the coating to be obtained, without the coating acquiring a sticky surface due to oxygen inhibition.

In a preferred embodiment of the invention, the process comprises applying a primer onto the surface prior to step (i).

In another preferred embodiment of the invention, the process comprises applying a topcoat after step (iv).

Other embodiments of the process according to the present invention are mentioned in the claims In a fifth aspect, the invention comprises a use of a granulate material according to the present invention, in a radical chain-growth polymerization based coating formulation, preferably for floor coating.

Other embodiments of the use according to the present invention are mentioned in the claims Other characteristics and advantages of the present invention will become clear from the non-limitative description and by reference to the figures and examples.

BRIEF DESCRIPTION OF THE SEVERAL VIEWS OF THE DRAWING

The one included FIGURE is a schematic overview of the self-regulating process according to the present invention to prevent oxygen inhibition in radical polymerization during application of cold curing coatings for coating construction elements.

Figure 1:
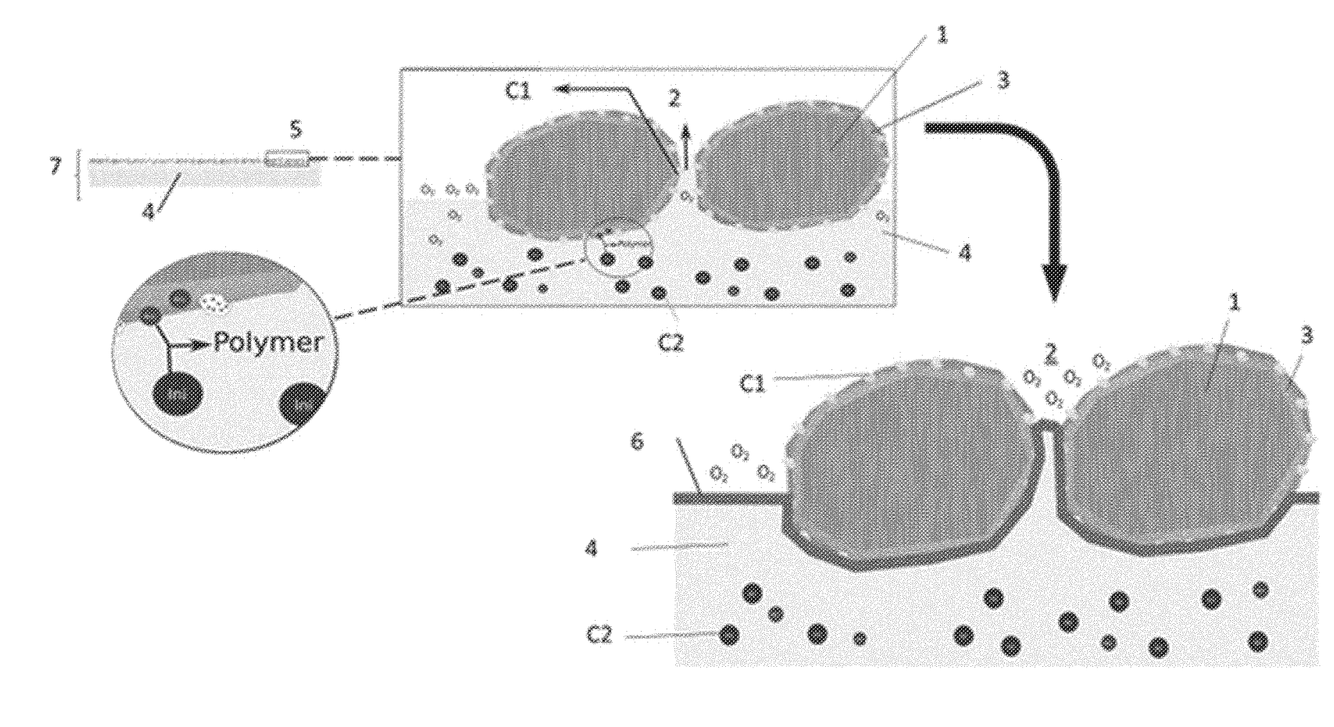

In the FIGURE, the same reference numbers are assigned to the same or similar elements.

As can be inferred from the FIGURE, the present invention relates to a process for applying a coating 7 onto a substrate. The coating 7 contains granulate materials 1 and a liquid resin 4 with a less pronounced odor, less toxicity, a reduced flammability, faster curing and a better balance between labor time and curing time. These improvements may be found in the coating formulations 7 of the present invention, combined with the durable and efficient production of coating films with good chemical and physical properties.

1. Granulate material 1 for a radical chain-growth polymerization based coating formulation 7 that is suitable for preventing inhibition 2 of resin polymerization by ambient air, comprising at least a granulate material 1 having an average particle size d50 of between 0.1 and 2 mm, selected from the group consisting of (i) apolar granulate materials 1 having a contact angle of 95° or more, when measured according to the norm ISO15989:2004, at least partially coated with at least one component C1, which is an accelerator and/or initiator, wherein the amount of component C1 is between 0.2 and 5 g/m² of apolar granulate material surface area, or (ii) granulate materials 1 coated with at least one component C1, which is an accelerator and/or initiator, wherein the amount of component C1 is sufficient to be suitable for enabling a resin polymerization which takes place faster than the inhibition by ambient conditions.

As can be seen, according to the present invention, it is possible to remedy at least part of the listed disadvantages by making available a granulate material 1 which can be used with different resin formulations, and which contributes to reducing odor and volatile organic components while simplifying the application of the floor coating formulation.

2. As can be seen, the granulate material according to the present inventions has a contact angle of 35° or more, preferably of 55° or more when measured with water according to the norm DIN 55660-2:2011-12, giving rise to a difference in polarity with the different types of resins and making application easier; or the granulate material is coated 1 with at least one component C1, which is an accelerator and/or initiator, wherein the amount of component C1 is sufficient to be suitable for enabling a resin polymerization which takes place faster than the inhibition by ambient conditions 2.

The apolar granulate material contains at least apolar granules and/or at least particles of granulate material which are at least partially coated with an apolar composition such as paraffin or wax.

The component C2 is commonly used in an amount ranging from 0.1 to 10 m %, preferably from 0.5 to 6 m % based on the total mass of the mixture of the liquid resin. The effective amount is to be chosen so that after applying the granulate materials, an oxygen barrier is formed after limited reaction due to polymerization within 30 min after applying the granulate materials, preferably within 10 min. Moreover, the concentration should be chosen so that the coating has a processing time (=the available time for applying the coating before the granulate materials are to be spread over the liquid surface) of a few minutes to a matter of hours, preferably between 5 min to 200 min, even more preferably between 5 min and 60 min, most preferably between 5 min and 30 min.

When the component C2 contains at least one initiator, it is preferably selected from the group comprising peroxides such as a ketone peroxide, a diacyl peroxide, a perester, a per-ketal, and more preferably dibenzoyl peroxide and dilauroyl peroxide which may contain a form of plasticizer, and a mixture thereof.

When the component C2 contains at least one accelerator, it is preferably selected from the amine group, more preferably tertiary amines or ammonium salts and mercaptans.

Indeed, with known coating formulations, when the floor coating is applied onto an existing substrate, the first step is mixing the different components of the resin and applying the mixture in the form of a layer 4 onto the existing substrate. The mixture of the different components may also contain a filler, or the filler may be applied on top of the resin layer. Next, the granulate material is applied in the form of a layer of granulate material 5, which not only should be applied as carefully as possible, but also sufficiently quickly to allow the polymerization of the resin and prevent the inhibition of polymerization by contact with the ambient air 2. Failing this will result in a very sticky and fragile surface. The onset polymerization begins at the interface between the surroundings and the resin and forms a hardening layer 6.

EXAMPLES 1 TO 9

The starting granulated raw materials of examples 1 to 7 (see table 1 below) are preheated under continuous stirring from 60° C. to 100° C. Once this temperature had been reached, the hydrophobic additive (if present in the formulation) was added. Next, still under continuous stirring, the component C1 was added. Finally, still under continuous stirring, a desiccant was added. This mixture was cooled to room temperature under continuous stirring.

The granulated raw materials of example 8 are not preheated to avoid premature decomposing of the initiator into radicals. Next, component C1 (in this case the initiator) was added under continuous stirring. The water glass binder was then added, still under continuous stirring. The mixture continued to be stirred until the most of water was evaporated and the granulate materials no longer stuck together.

The granulated raw materials of example 9 are mixed together at room temperature until a homogenous mixture is obtained.

Their can be noticed that in case no hydrophobic additive is used as in example 6 and as such a lower contact angle is obtained, the amount of DHEPT required in order to obtain a functional granulate is significantly higher than in examples 1 to 5

TABLE 1

| | Granulated raw materials | Hydrophobic additive | C1: accelerator or initiator | Desiccant | Contact angle* | Binder |
|---|---|---|---|---|---|---|
| Ex. 1 | Quartz gravel with 90% of all granule diameters comprised between 0.4 and 0.8 mm | 0.5 m % Paraffin with a melting point of 52° C. | 0.4 m % DHEPT (N,N-bis (2-hydroxyethyl)-p-toluidine) | 0.7 m % Fumed silica | >50° | / |
| Ex. 2 | Quartz gravel with 90% of all granule diameters comprised between 0.8 and 1.2 mm | 0.24 m % Paraffin with a melting point of 52° C. | 0.24 m % DHEPT (N,N-bis (2-hydroxyethyl)-p-toluidine) | 0.24 m % Fumed silica | >50° | / |
| Ex. 3 | Epoxy colored Quartz gravel with 90% of all granule diameters comprised between 0.4 and 0.8 mm | 0.5 m % Paraffin with a melting point of 52° C. | 0.4 m % DHEPT (N,N-bis (2-hydroxyethyl)-p-toluidine) | 0.7 m % Fumed silica | >50° | / |
| Ex. 4 | Quartz gravel with 90% of all granule diameters comprised between 0.4 and 0.8 mm | 0.5 m % Paraffin with a melting point of 52° C. | 0.8 m % PTE (para-Toluidine, Ethoxylated) | 0.7 m % Fumed silica | >50° | / |

TABLE 1-continued

| | Granulated raw materials | Hydrophobic additive | C1: accelerator or initiator | Desiccant | Contact angle* | Binder |
|---|---|---|---|---|---|---|
| Ex. 5 | Silicon carbide with 90% of all granule diameters comprised between 0.6 and 1 mm | 0.5 m % Paraffin with a melting point of 52° C. | 0.4 m % DHEPT (N,N-bis (2-hydroxyethyl)-p-toluidine) | 0.7 m % Fumed silica | >50° | / |
| Ex. 6 | Quartz gravel with 90% of all granule diameters comprised between 0.4 and 0.8 mm | / | 3 m % DHEPT | 0.7 m % Fumed silica | <1° | / |
| Ex. 7 | Ultra-high density polyethylene granules with 90% of all granule diameters comprised between 0.4 and 0.8 mm | / | 1.58 m % DHEPT (N,N-bis (2-hydroxyethyl)-p-toluidine) | 0.2 m % Fumed silica | >35° | / |
| Ex. 8 | Quartz gravel with 90% of all granule diameters comprised between 0.4 and 0.8 mm | / | 2,3 m % component containing 50 m % Dibenzoyl peroxide with dicyclohexyl phthalate and silica) | / | <1° | 1.5 m % water-glass solution (CAS 1344-09-8) |
| Ex. 9 | 80 m % granulate materials from ex. 3 + 20 m % Epoxy colored Quartz gravel with 90% of all granule diameters comprised between 0.4 and 0.8 mm | / | / | / | | / |

*measured according to DIN 55660-2: 2011-12

EXAMPLES 10-16: FLOOR COATING FORMULATION KIT FOR USE AT 20° C.

6 floor coating formulation kits were prepared. They comprise 4 components:
  a) a liquid resin, prepared by stirring until a homogenous mixture is obtained:
    98.9 m % DPGDA
    0.1 m % accelerator, being DHEPT
    0.5 m % CABOSIL TS 720 (anti deposit additive)
  b) a filler:
    300 m %, relative to the liquid resin, of quartz flour M4 from the company Sibelco
  c) an initiator:
    4 m %, relative to the liquid resin, containing 50 m % Dibenzoyl peroxide with dicyclophexyl phthalate and silica)
  d) a specific granulate material according to examples 1-5 and according to example 9. The granulate material was used at 3 kg/m² of floor surface.

The floor coat was prepared according to the process of the invention. Specifically, a mixture was first made of the following components: 5 kg of component a, 15 kg component b and 0.2 kg of component C. This was carried out by adding those components together in a bucket and stirring for 2 min using a power drill with a paint stirrer. Next, this mixture was poured onto the surface to be coated, in this case a concrete floor to which an epoxy primer had already been applied. Then, the mixture was smoothed within 15 min using a skimmer, ensuring that the total thickness of the applied layer was between 3 and 4 mm. Next, the mixture was manually covered (filled in) with component D, with 3 kg of granulate material per m² of coating surface being applied during covering (filling in). This is more than sufficient to ensure that no non-covered portions remain that are larger than 1 mm². After a 1 hour wait, the coating was found to be cured with no sticky surface. Finally, any remaining loose granulate materials (the excess) are removed with a brush or vacuum cleaner. If so desired, the coating can be further finished with a topcoat; in this case, a topcoat based on epoxy resin was used.

EXAMPLES 17-22.—FLOOR COATING FORMULATION FOR USE AT 20° C.

6 floor coating formulation kits were prepared. They comprise 4 components:
  a) a liquid resin, prepared by stirring until a homogenous mixture is obtained:
    i. 98.9 m % BDGMA
    i. 0.1 m % accelerator, being DHEPT
    b. 0.5 m % CABOSIL TS 720 (anti deposit additive)
  b) a filler: 300 m %, relative to the liquid resin, of quartz flour M4 from the company Sibelco
  c) an initiator: 4 m %, relative to the liquid resin, containing 50 m % Dibenzoyl peroxide with dicyclohexyl phthalate and silica)
  d) a specific granulate material according to examples 1-5 and according to example 9. The granulate material was used at 3 kg/m² of floor surface The floor coat was prepared according to the process of the invention to a layer thickness of 4 mm and curing in less than 60 min, with no sticky surface

EXAMPLE 23-29.—FLOOR COATING FORMULATION FOR USE AT 20° C.

6 floor coating formulation kits were prepared. They comprise 4 components:
  a) a liquid resin, prepared by stirring until a homogenous mixture is obtained:
    64.9 m % DPGDA,
    20 m % HEMA,
    15 m % polyvinyl acetate (low molecular mass),
    0.1 m % DHEPT and
    0.3 m % CABOSIL TS 720 (anti deposit additive)
  b) a filler: 200 m %, relative to the liquid resin, of quartz flour M4 from the company Sibelco
  c) an initiator: 4 m %, relative to the liquid resin, containing 50 m % Dibenzoyl peroxide with dicyclophexyl phthalate and silica
  d) a specific granulate material according to examples 1-5 and according to example 9. The granulate material was used at 3 kg/m² of floor surface.

The floor coat was prepared according to the process of the invention to a layer thickness of 4 mm and curing in less than 60 min, with no sticky surface

EXAMPLES 30-36.—FLOOR COATING FORMULATION FOR USE AT 20° C.

6 floor coating formulation kits were prepared. They comprise 4 components:
a) a liquid resin, prepared by stirring until a homogenous mixture is obtained:
49.3 m % HEMA,
40 m % eberyl 230 from supplier Allnex (PU-acrylate)
10 m % lauryl methacrylate,
0.2 m % DHEPT
0.5 m % CABOSIL TS 720 (anti deposit additive)
b) a filler: 200 m %, relative to the liquid resin, of quartz flour M4 from the company Sibelco
c) an initiator: 4 m %, relative to the liquid resin, containing 50 m % Dibenzoyl peroxide with dicydohexyl phthalate and silica
d) a specific granulate material according to examples 1-5 and according to example 9. The granulate material was used at 3 kg/m$^2$ of floor surface.

The floor coat was prepared according to the process of the invention to a layer thickness of 4 mm and curing in less than 60 min, with no sticky surface

EXAMPLES 37-43.—FLOOR COATING FORMULATION FOR USE AT 20° C.

6 floor coating formulation kits were prepared. They comprise 4 components:
a) a liquid resin, prepared by stirring until a homogenous mixture is obtained:
48.9 m % HEMA
50 m % BDGMA
0.1 m % DHEPT
0.5 m % CABOSIL TS 720 (anti deposit additive)
b) a filler: 200 m %, relative to the liquid resin, of quartz flour M4 from the company Sibelco
c) an initiator: 4 m %, relative to the liquid resin, containing 50 m Dibenzoyl peroxide with dicyclohexyl phthalate and silica
d) a specific granulate material according to examples 1-5 and according to example 9. The granulate material was used at 3 kg/m$^2$ of floor surface.

The floor coat was prepared according to the process of the invention to a layer thickness of 4 mm and curing in less than 60 min, with no sticky surface

EXAMPLES 44-50.—FLOOR COATING FORMULATION FOR USE AT 20° C.

6 floor coating formulation kits were prepared. They comprise 4 components:
a) a liquid resin, prepared by stirring until a homogenous mixture is obtained:
59.8 m % DPGDA
40 m % polyvinyl acetate, characterized by a molecular weight Mw of 150 000
0.2 m % DHEPT
b) a filler: 100 m %, relative to the liquid resin, of quartz flour M4 from the company Sibelco
c) an initiator: 8 m %, relative to the liquid resin, containing 50 m % Dibenzoyl peroxide with dicyclohexyl phthalate and silica
d) a specific granulate material according to examples 1-5 and according to example 9. The granulate material was used at 3 kg/m$^2$ of floor surface.

The floor coat was prepared according to the process of the invention to a layer thickness of 4 mm and curing in less than 30 min, with no sticky surface

EXAMPLES 51-59.—FLOOR COATING FORMULATION FOR USE AT 20° C.

6 floor coating formulation kits were prepared. They comprise 3 components:
a) a liquid resin, prepared by stirring until a homogenous mixture is obtained:
59.8 m % DPGDA
40 m % polyvinyl acetate, characterized by a molecular weight Mw of 150 000
0.2 m % DHEPT
b) an initiator: 8 m %, relative to the liquid resin, containing 50 m % Dibenzoyl peroxide with dicyclohexyl phthalate and silica
c) a specific granulate material according to examples 1-7 and according to example 9. The granulate material was used at 3 kg/m$^2$ of floor surface.

The floor coat was prepared according to the process of the invention to a layer thickness of 1 mm and curing in less than 30 min, with no sticky surface

EXAMPLE 60.—FLOOR COATING FORMULATION FOR USE AT 20° C.

A floor coating formulation kit was prepared. It comprise 4 components:
a) a liquid resin, prepared by stirring until a homogenous mixture is obtained:
55.2 m % DPGDA
40 m % LMA
4.8 m % DHEPT
b) a filler: 250 m %, relative to the liquid resin, of quartz flour M4 from the company Sibelco
c) an initiator: 3.4 m % tov the mass of the liquid resin lauryl peroxide
d) granulate material according to example 8 and was used at 3 kg/m$^2$ of floor surface.

The floor coat was prepared according to the process of the invention to a layer thickness of 4 mm and curing in less than 60 min, with no sticky surface.

The invention claimed is:
1. A granulate material for a radical chain-growth polymerization based coating formulation, the granulate material having an average particle size d50 of between 0.1 and 2 mm, measured according to ASTM C136, is selected from the group consisting of (i) apolar granulate materials having a contact angle with water of 35° or more, when measured according to the norm DIN 55660-2:2011-12, at least partially coated with at least one component C1, which is an accelerator and/or a radical initiator, wherein the amount of component C1 is more than 0.2 g/m$^2$ and less than 5 g/m$^2$ of apolar granulate material surface area, or (ii) granulate materials coated with at least one component C1, which is an accelerator or a radical initiator, wherein the amount of component C1 is more than 4 g/m$^2$ and less than 10 g/m$^2$ and mixtures thereof, wherein, when component C1 is an accelerator, said accelerator is selected from tertiary amines, ammonium salts and mercaptans.
2. A granulate material for a radical chain-growth polymerization based coating formulation according to claim 1, wherein the granulate material contains at least apolar granules and/or at least particles of granulate material which are at least partially coated with an apolar composition.

3. A granulate material for a radical chain-growth polymerization based coating formulation according to claim 2, wherein the at least present granulate material has a particle size $d_{30}$ of between 0.4 and 0.8 mm and/or has a particle size $d_{70}$ of between 0.8 mm and 1.2 mm, measured by ASTM C136.

4. A granulate material for a radical chain-growth polymerization based coating formulation according to claim 2, wherein the apolar composition is selected from linear hydrocarbons of the general formula $C_nH_{2n+2}$, wherein n has a value of between 10 and 70, and an iso- and cycloalkanes/paraffins content of from 0 to 60%, microcrystalline wax, carnauba wax, beeswax, lanolin, whale oil, a polyolefin wax, ceresin, candelilla wax, and a mixture thereof.

5. A granulate material for a radical chain-growth polymerization based coating formulation according to claim 1, wherein the component C1 contains at least one initiator.

6. A granulate material for a radical chain-growth polymerization based coating formulation according to claim 2, wherein the particles of granulate material are selected from quartz, metal carbides, sand, metal particles, marble, dolomite, glass, ceramics, or wherein the granules are polymeric granules.

7. A granulate material for a radical chain-growth polymerization based coating formulation according to claim 1, wherein the apolar granulate material is further coated with a desiccant, in an amount of from 0.5 to 2 mass %.

8. A composition of granulate material for a radical chain-growth polymerization based coating formulation, comprising at least one granulate material according to claim 1.

9. A coating formulation kit comprising:
(a) At least one granulate material according to claim 1,
(b) A base coat kit, comprising at least one component C2 which is the same or is not the same as component C1, which is an initiator or accelerator, further comprising at least one liquid resin, said liquid resin comprising at least 30 mass % of at least one vinyl group containing monomer, polymer or oligomer or a mixture thereof, wherein, when component C1 is an accelerator, said accelerator is selected from tertiary amines, ammonium salts and mercaptans.

10. A coating formulation kit according to claim 9, wherein, in the present coating formulation kit, at least from 0.01 to 10 mass %, of at least one accelerator, based on the mass of the liquid resin, is present, either on the apolar granulate material or in the base coat kit or both, further containing at least from 0.1 to 10 mass % of at least one redox-initiating radical initiator based on the mass of the liquid resin, either on the granulate material (i), granulate material (ii) or in the base coat kit or all three.

11. A coating formulation kit according to claim 9, further comprising at least one additional kit selected among a primer kit, a topcoat kit or a combination of both.

12. A coating formulation kit according to claim 9, wherein the liquid resin has a vapor pressure of less than 0.1 kPa at 20° C.

13. A coating formulation kit according to claim 9, wherein the component C2, contains at least one initiator selected from peroxides, a perester, a per-ketal, acetylacetone peroxide, dilauroyl peroxide, ketone peroxide, methyl isobutyl ketone peroxide, cyclohexanone peroxide, dibenzoyl peroxide, tert-butyl peroxy benzoate, tert-butyl peroxy isopropyl carbonate, 2,5-bis-(2-ethylhexanoylperoxy)-2,5-dimethylhexane, tert-butyl peroxy-2-ethylhexanoate, tert-butyl peroxy-3,5,5-trimethylhexanoate, 1,1-bis(tert-butyl peroxy) cyclohexane, 1,1-bis-(tert-butyl peroxy)-3,3,5-trimethyl cyclohexane, cumyl hydroperoxide, tert-butyl hydroperoxide, dicumyl peroxide, bis-(4-tert-butylcyclohexyl) peroxide carbonate and mixtures thereof.

14. A coating formulation kit according to claim 9, wherein the base coat kit further contains at least one filler in an amount of 1 to 4 times the mass of the liquid resin.

15. A process for applying a radical chain-growth polymerization based coating formulation kit according to claim 9 onto a surface, the process comprising:
(i) mixing components of the base coat kit
(ii) applying the base coat onto the surface,
(iii) distributing said at least one granulate material (i) or (ii) over the surface of the previously applied base coat mixture
(iv) curing the base coat so as to form the coating on a surface.

16. A process for applying a radical chain-growth polymerization based coating formulation kit according to claim 15, wherein the surface is a substrate and wherein the application occurs within 60 minutes from the mixing of components of the base coat kit, at a thickness of 0.2 to 10 mm.

* * * * *